(12) United States Patent
Hamada

(10) Patent No.: US 8,238,266 B2
(45) Date of Patent: Aug. 7, 2012

(54) COMMUNICATION DEVICE AND METHOD FOR CONTROLLING COMMUNICATION DEVICE

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 12/707,542

(22) Filed: Feb. 17, 2010

(65) Prior Publication Data

US 2010/0208731 A1 Aug. 19, 2010

(30) Foreign Application Priority Data

Feb. 19, 2009 (JP) ................................. 2009-036656

(51) Int. Cl.
H04L 12/28 (2006.01)
(52) U.S. Cl. ........................................ 370/254; 370/401
(58) Field of Classification Search .................. 370/254, 370/255, 328, 338, 389, 401
See application file for complete search history.

(56) References Cited

U.S. PATENT DOCUMENTS

| 7,073,055 | B1* | 7/2006 | Freed et al. ................... 713/155 |
| 7,529,815 | B2* | 5/2009 | Droms .......................... 709/220 |
| 2001/0032265 | A1 | 10/2001 | Tanaka | |
| 2002/0039892 | A1* | 4/2002 | Lindell ....................... 455/151.1 |
| 2005/0066033 | A1* | 3/2005 | Cheston et al. ............... 709/225 |
| 2005/0114341 | A1* | 5/2005 | Droms ............................ 707/10 |
| 2006/0002353 | A1* | 1/2006 | Doi ............................. 370/338 |
| 2006/0116104 | A1* | 6/2006 | Yang ............................. 455/403 |
| 2007/0140113 | A1* | 6/2007 | Gemelos ...................... 370/229 |
| 2007/0147317 | A1* | 6/2007 | Smith et al. .................. 370/338 |
| 2008/0151851 | A1* | 6/2008 | Sitch ............................ 370/338 |

FOREIGN PATENT DOCUMENTS

JP 2001-298481 A 10/2001
JP 2007-174704 A 7/2007

* cited by examiner

Primary Examiner — Hong Cho
(74) Attorney, Agent, or Firm — Carter, DeLuca, Farrell & Schmidt LLP

(57) ABSTRACT

A communication device includes a recognition unit configured to recognize a service provided by a network, a generation unit configured to generate a packet to be transmitted to an external device that provides the service recognized by the recognition unit based on a priority set to the packet according to the recognized service when the service is recognized by the recognition unit, and a connection unit configured to establish a connection with the external device using the packet generated by the generation unit.

6 Claims, 7 Drawing Sheets

FIG.3

301 PRIORITY CORRESPONDENCY TABLE

| Priority | TARGET UPnP Service Type |
|---|---|
| Network Control | Schemas-upup-org:service:QosManager:2<br>Schemas-upup-org:service:Internet Gateway Device:2<br>Schemas-upup-org:service:AVTrasPort:1 |
| Voice | Schemas-upup-org:service:Media Renderer:2<br>Schemas-upup-org:service:Media Server:2 |

302 PRIORITY INFORMATION TABLE

| Priority | Port No. | IP Address | Service Type |
|---|---|---|---|
| Network Control | aaaa | xxx.xxx.xx.xxx | AVTransport |
| | bbbb | yyy.yyy.yy.yyy | QoSManager |
| | | xxx.xxx.xx.xxx | QoSManager |
| Voice | cccc | zzz.zzz.zz.zzz | Media Server |

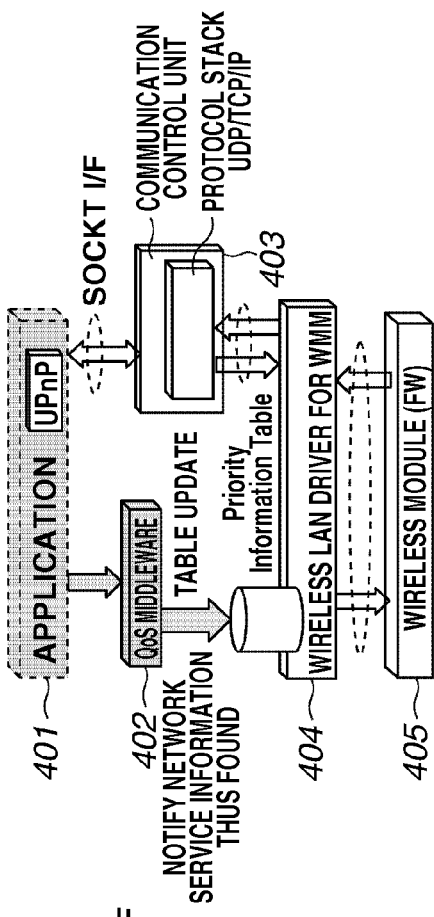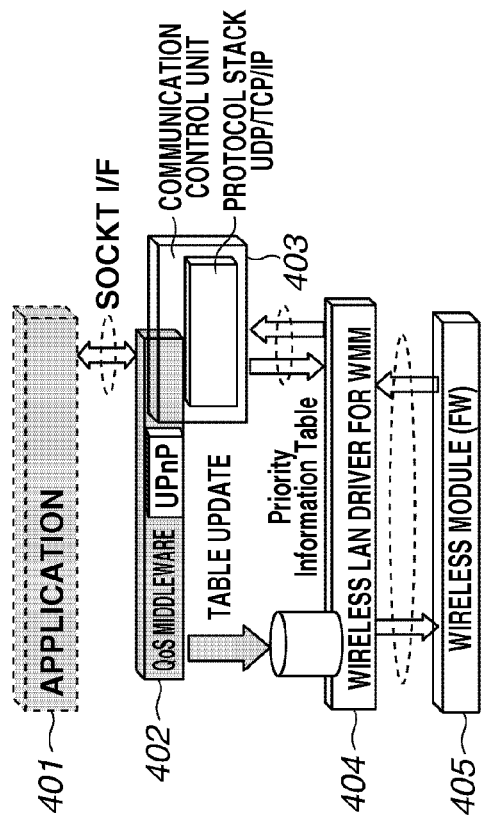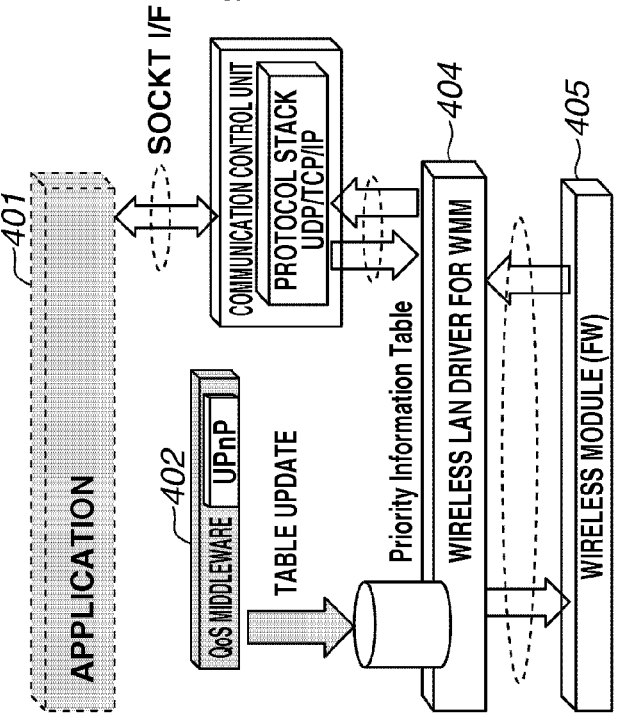

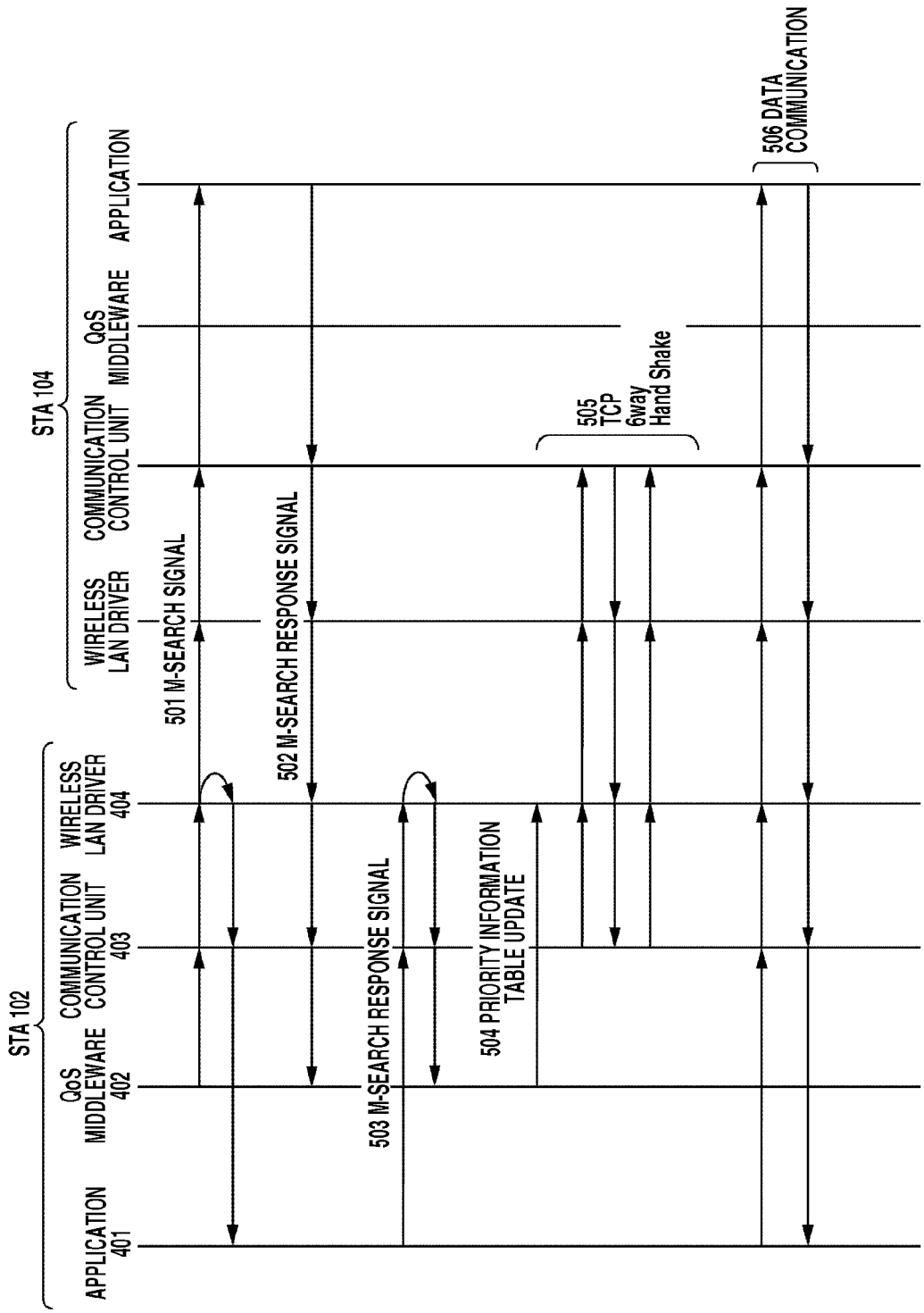

COMMUNICATION DEVICE AND METHOD FOR CONTROLLING COMMUNICATION DEVICE

BACKGROUND OF THE INVENTION

1. Field of the Invention

The present invention relates to a communication device, a method for controlling the communication device and a program thereof.

2. Description of the Related Art

Conventionally, Quality of Service (QoS) has been known as a technique for securing communication quality on a network such as a Local Area Network (LAN). U.S. Patent Application Publication No. 2006/0002353 discusses a configuration to perform QoS control in which a virtual Local Area Network (VLAN) tag is set based on a Type of Service (TOS) that is preliminarily decided by a user according to a correspondency table between the TOS and the VLAN tag. Japanese Patent Laid-open No. 2007-174704 discusses a configuration to perform QoS control in which a communication port that is used by an application is monitored and a transmission output is powered up when a specific port, which is preliminarily determined by the user, is used.

However, in the above-discussed conventional techniques, the QoS control is not performed in a connection in a Transmission Control Protocol (TCP). Therefore, when other communications having a priority higher than, for example, that of a communication without the QoS control, the connection in the TCP sometimes results in failure or a delay. However, if, for example, a higher priority is set to all of the packets that are used in the connection in the TCP, communication load of the network increases.

SUMMARY OF THE INVENTION

The present invention is directed to a communication device, a method for controlling the communication device and a program thereof that can perform Quality of Service (QoS) control in connecting with other devices (external devices) by using a packet to which a priority is set, when a service is provided on a network.

According to an aspect of the present invention, a communication device includes a recognition unit configured to recognize a service provided by a network, a generation unit configured to generate a packet to be transmitted to an external device that provides the service recognized by the recognition unit based on a priority set according to the recognized service, when the service is recognized by the recognition unit, and a connection unit configured to establish a connection with the external device using the packet generated by the generation unit.

According to the present invention, the communication device can perform the QoS control when connected. More specifically, when the communication device is connected by using the packet to which a higher priority is set, failure or delay of the connection is reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a priority correspondency table and a priority information table, respectively.

FIGS. 4A-4C are functional block diagrams of an STA.

FIG. 5 is a sequence chart between stations (STAs).

DESCRIPTION OF THE EMBODIMENTS

Various exemplary embodiments, features, and aspects of the invention will be described in detail below with reference to the drawings.

Figure 1:
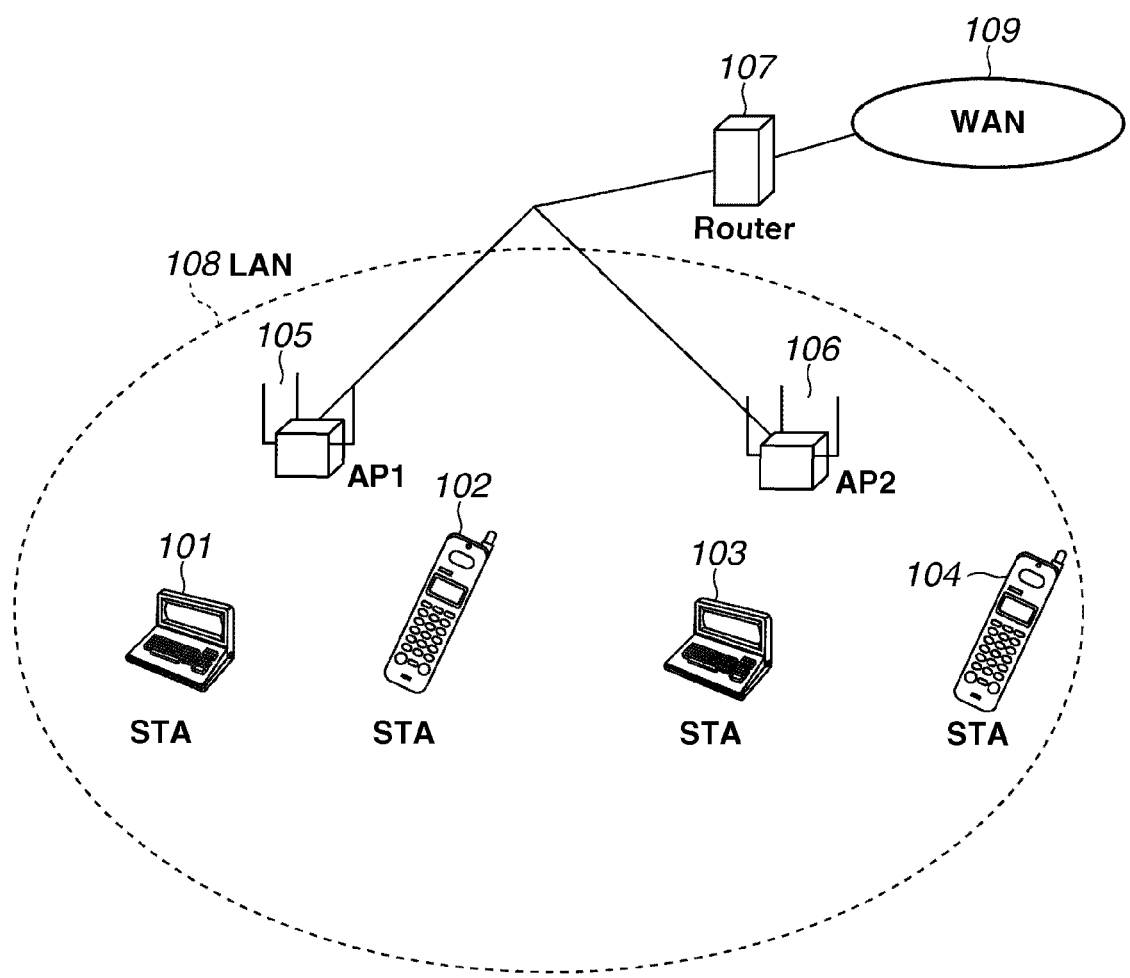
FIG. 1 illustrates a network configuration.

FIG. 1 illustrates a network configuration according to an exemplary embodiment of the present invention. Communication devices according to the present exemplary embodiment can establish a mutual communication through a wireless communication in compliance with an Institute of Electrical and Electronics Engineers (IEEE) 802.11 series. Further, the communication devices (101 through 107) according to the present exemplary embodiment can perform Quality of Service (QoS) control by using an Enhanced Distributed Channel Access (EDCA) method that is prescribed by a Wi-Fi Multi Media (WMM). Any method can be employed for performing the QoS control in addition to the EDCA method.

Stations (STAs) 101 through 104 can be connected to the below-described access points (APs). The STA 102 includes an application that provides a voice communication service by using a Voice over Internet Protocol (VoIP) and an Audio/Visual Transport (AVTransport) service in which a control command, such as a fast-forward and a rewind, is accepted.

The STA 102 and the STA 104 are in compliance with the Universal Plug and Play (UPnP) (trademark). The STA 105 and the STA 106 are Access Points (APs). The AP 105 and the AP 106 constitute a wireless cell and are connected to the STAs 101 through 104 located in the wireless cell. The router 107 connects a Local Area Network (LAN) with a Wide Area Network (WAN), which will be described later. The LAN 108 includes the STAs 101 through 104 and the APs 105 and 106.

Figure 2:
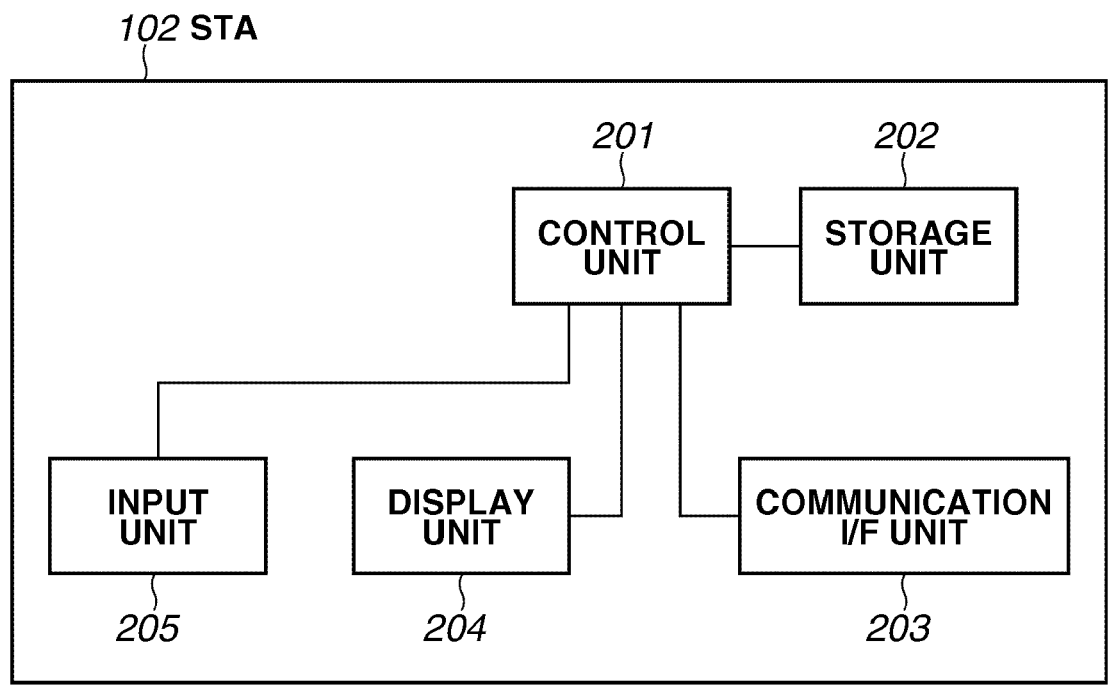
FIG. 2 is a block diagram illustrating a hardware configuration of a station (STA).

FIG. 2 is a block diagram illustrating an example of a hardware configuration of the STA 102.

A control unit 201 realizes a below-described flow chart by reading out and executing a program stored in a storage unit, which is described below. A storage unit 202 stores a program, which is executed by the control unit 201, and a below-described priority information table to be used for the QoS control.

A communication interface (I/F) unit 203 communicates with external devices such as access points (APs) and the other communication devices. A display unit 204 displays various displays and includes a function for outputting visually recognizable information, e.g., an LCD or an LED, or a function for outputting sound, e.g., a speaker. An input unit 205 is used by the user for inputting various pieces of information. An example of the various kinds of information includes sound information.

FIG. 3 illustrates examples of a priority correspondency table and a priority information table, respectively, stored in the storage unit 202. The priority correspondency table 301 associates a type of service (UPnP Service Type) that is provided by the application with a predetermined priority. Information of the type of the service can be acquired from the application that provides the service.

A Network Control has a priority higher than that of a Voice. In an Enhanced Distributed Channel Access (EDCA), a Video, a Best Effort, and a Back Ground are defined as having a priority lower than that of the Voice. In the priority correspondency table, a port number (Port No.) used by the application may be associated with the priority other than the above case.

The priority information table 302 includes the Port Numbers and the Internet Protocol (IP) Addresses, which are used by the services provided by the application. The Port Numbers and the IP addresses can be acquired from header information contained in a packet. Further, the priority information table 302 includes priorities determined based on the priority correspondency table 301. STA 102 performs the QoS control based on the priority information table 302.

FIG. 4A illustrates a functional block of the STA 102. In the present exemplary embodiment, the functional block of FIG. 4A is realized in a manner that the control unit 201 reads out and executes the program stored in the storage unit 202. The STAs 101, 103, and 104, respectively, has the similar functional block, so that the descriptions of the STAs 101, 103 and 104 are omitted here.

A communication application 401 provides a voice communication service using the VoIP, and an AVTransport service that accepts control commands such as a fast-forward and a rewind. A QoS middleware 402 acquires service information that is provided by the communication application 401. The QoS middleware 402 can acquire the service information by using a Simple Service Discovery Protocol (SSDP), which serves as a device architecture function of the UPnP. The service information includes a service type of the application.

The QoS middleware 402 determines a priority based on the priority correspondency table 301 from the service type, which is contained in the acquired service information, and updates the priority information table 302. A communication control unit 403 controls a packet according to a protocol of, for example, Transmission Control Protocol/Internet Protocol (TCP/IP).

A wireless LAN driver 404 sends a packet input from the communication application 401 through the communication control unit 403 according to an appropriate priority. The appropriate priority is set in a manner that the wireless LAN driver 404 refers to the priority information table 302. The wireless LAN driver 404 complies with the WMM.

A wireless LAN module 405 physically sends a packet to the network. The functional block diagrams of FIGS. 4A-4C may be realized by hardware such as an Application Specific Integrated Circuit (ASIC) or may be realized by a combination of the hardware and software.

Figure 6:
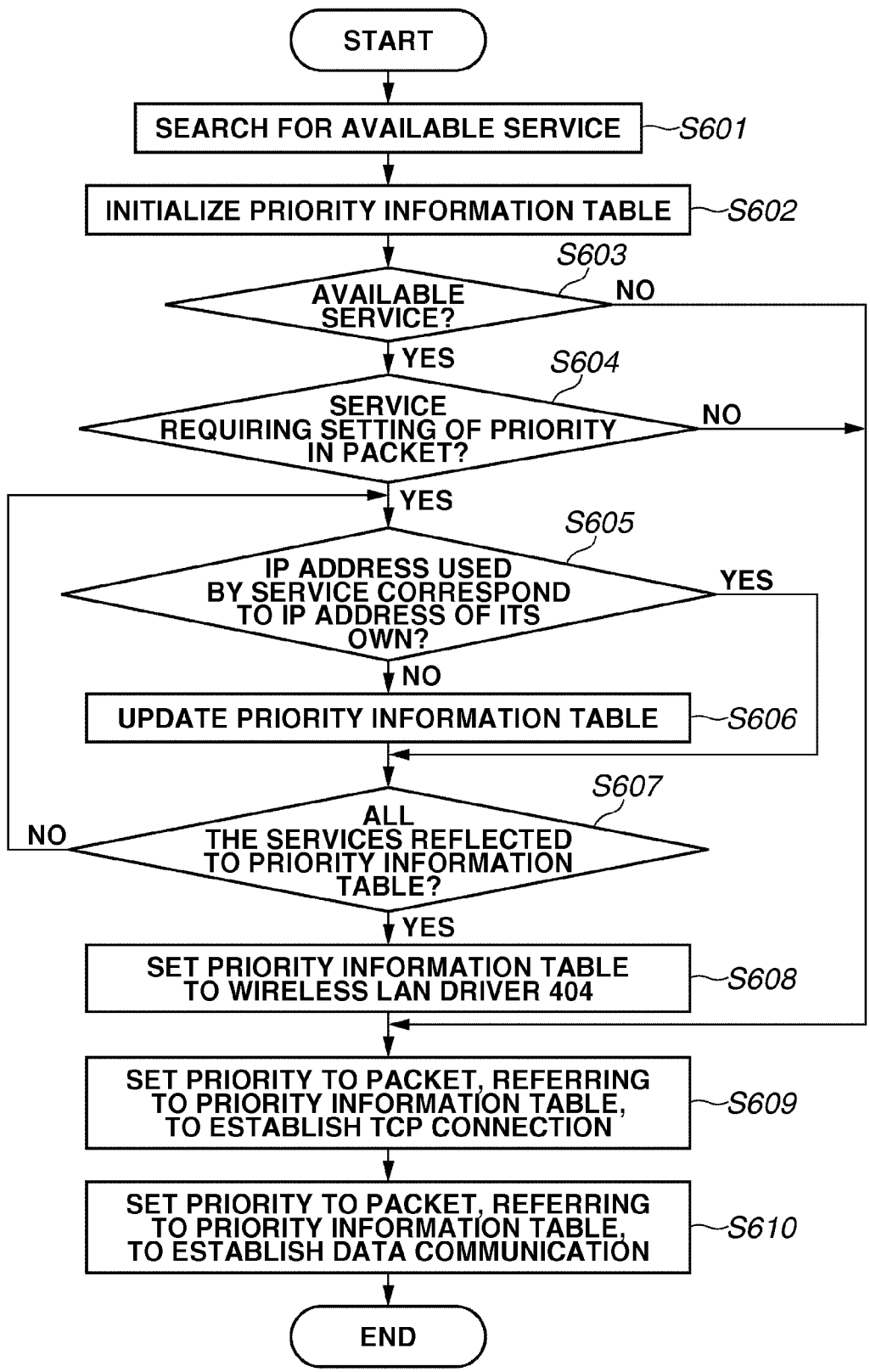
FIG. 6 is a flow chart illustrating processing of the STA.

FIG. 5 is a sequence chart at a time when the STA 102 and the STA 104 start a data communication. FIG. 6 is a flow chart illustrating processing of the STA 102 when the STA 102 and the STA 104 start the data communication. The flow chart is realized in a manner that the control unit 201 reads out and executes the program that is stored in the storage unit 202.

A method by which the STA 102 updates the priority information table 302 and sets the appropriate priority to the packet is described below with reference to FIGS. 5 and 6. The STA 102 and the STA 104 can provide the Voice Communication service and the AVTransport service by executing the communication application.

In step S601, the QoS middleware 402 searches for a service, which is provided by the communication device on the LAN 108, according to an instruction by the control unit 201. The service available by the communication device is searched for in the following manner.

The QoS middleware 402 sends a M-SEARCH signal 501 defined by the SSDP to the LAN 108. The M-SEARCH signal is adapted to search for a service that is provided by the communication device on the LAN 108. The M-SEARCH signal 501, which was sent by the STA 102, is received by the STA 104. The M-SEARCH signal 501 is further transmitted to the communication application that is in execution by the STA 104.

The communication application of the STA 104, after receiving the M-SEARCH signal 501, sends a response signal 502 responding to the M-SEARCH signal to the QoS middleware 402 of the STA 102. The response signal 502 responding to the M-SEARCH signal includes the IP address and the port number, which are used by the communication application, and a service descriptor, which is provided by the communication application of the STA 104. The service descriptor includes the service type of the application.

The M-SEARCH signal 501 is also transmitted to the communication application 401 of the STA 102. The communication application 401, after receiving the M-SEARCH signal 501, sends a response signal 503 responding to the M-SEARCH signal to the QoS middleware 402.

As described above, the QoS middleware 402 can search for the service, which is provided by the communication device on the LAN 108. As a result of the search, the QoS middleware 402 recognizes that the STA 102 can provide a Media Renderer service and the AVTransport service. Further, the QoS middleware 402 recognizes that the STA 104 can provide a Media Server service and the AVTransport service.

In the present exemplary embodiment, the services provided by the own device (STA 102) and the other device (STA 104) were searched for by using the SSDP. In addition to the above, a service search protocol such as Simple Network Management Protocol (SNMP) and Service Discovery Protocol (SDP) defined in Bluetooth may be used.

In step S602, the QoS middleware 402 initializes the priority information table 302 according to an instruction of the control unit 201. The initialization enables deletion of information of services, which are not provided on the LAN 108, from the priority information table 302.

In step S603, the QoS middleware 402 determines whether or not there is a service available by the communication device on the LAN 108 according to the instruction of the control unit 201. In the present exemplary embodiment, reception of the response signal responding to the M-SEARCH signal enables the QoS middleware 402 to recognize the service provided by the other device. If there is the service available by the other device (YES in step S603), the processing goes to step S604.

In step S604, the QoS middleware 402 determines whether or not there is a service that an appropriate priority is to be set to the packet in the services available by the communication devices on the LAN 108. The service type of the application is acquired from the response signal responding to the M-SEARCH signal. Further, the QoS middleware 402 determines whether or not there is the service that the priority is set based on the acquired service type with reference to the priority correspondency table 301.

When the QoS middleware 402 determines as the service type that the appropriate priority is to be set to the packet (YES in step S604), the processing goes to step S605. In the present exemplary embodiment, the services such as the Media Server service and the AVTransport service can be provided by executing the communication application by the STA 104. Therefore, the processing goes to step S605.

In step S605, the QoS middleware 402 determines whether or not an IP address of the communication device that provides the service, in which the appropriate priority is to be set to the packet, coincides with the IP address of the own device. If the above IP addresses coincide with each other (YES in step S605), the processing goes to step S607. On the other hand, if the IP addresses do not coincide with each other (NO in step S605), the processing goes to step S606.

If the determination is made that the service is available by the STA 102, the IP addresses coincide with each other (YES in step S605). Therefore, the processing goes to step S607. On the other hand, if the determination is made that the service is available by the STA 104, the IP addresses do not coincide with each other (NO in step S605). Therefore, the processing goes to step S606. As described above, the service available by the own device (STA 102) can be discriminated from the service available by the other device (STA 104).

In step S606, the QoS middleware 402 updates the priority information table 302 according to the instruction of the control unit 201. In other words, the QoS middleware 402 adds service information, such as the service type, the IP address, and the port number of the other device to which the service is provided, and the priority used in the service, to the priority information table 302.

Accordingly, it is known that the service corresponding to the IP address and the port number listed in the priority information table 302 can be provided on the LAN 108. After updating the priority information table 302, the processing goes to step S607.

In step S607, the QoS middleware 402 confirms whether or not a change of the priority information table 302 is completed with respect to all the services in which the priorities are to be set according to the instruction of the control unit 201. If the QoS middleware 402 confirms the completion of the change (YES in step S607), the processing goes to step S608. On the other hand, if the QoS middleware 402 does not confirm the completion of the change (NO in step S607), the processing returns to step S605.

In step S608, the QoS middleware 402 sets the priority information table 302 to the wireless LAN driver 404 according to the instruction of the control unit 201. Accordingly, the wireless LAN driver 404 sets the priority for every combination of the port number and the IP address of the packet sending destination and sends the packet. In other words, the packet is sent according to the priority of the respective available services.

In the present exemplary embodiment, since the priority information table 302 is set to the wireless LAN driver 404, the wireless LAN driver 404 uses the packet to which the priority is set in a case of the below-described TCP connection. Accordingly, the communication device can perform the QoS control when connected.

When the wireless LAN driver 404 sends the packet to which the priority is set, if the combination of the port number and the IP address of the packet sending destination is not described in the priority information table 302, the wireless LAN driver 404 sets the priority lower than a predetermined priority to the packet. The priority lower than the predetermined priority such as the Network Control or the Voice may be set here, however, the lowest priority (Back Ground) is to be set in the present exemplary embodiment. The priority such as the Best Effort may also be set here in addition to the above.

Accordingly, the packet having a higher priority, although the service of the packet sending destination is not available on the network, can be prevented from being sent out.

Subsequently, in step S609, the communication application 401 establishes the connection over the TCP (hereinafter referred to as the "TCP connection") by a 3 Way Handshake (see 505 in FIG. 5) according to the instruction of the control unit 201. In the typical communication control unit, even though an upper application designates the priority, the priority is not reflected to the packet in the TCP connection.

In the present exemplary embodiment, in step S608, the priority information table 302 is set to the wireless LAN driver 404, so that the wireless LAN driver 404 sets the priority also to the packet in the TCP connection with reference to the priority information table 302. The wireless LAN driver 404 establishes the connection by using the packet to which the priority is set. Accordingly, the communication device can perform the QoS control upon connection.

The TCP connection is established for every service provided by the communication application. The TCP connection is established for the voice communication service. Further, the TCP connection is established every time when a control command is transmitted in order to perform a single control such as the fast-forward or the rewind.

Accordingly, in the case where the voice communication service with the priority of the Voice is performed between the STA 102 and the STA 104, since the TCP connection and the communication of the control command with a priority higher than the priority of the Voice, delay or abandonment of the control command can be reduced. More specifically, when the control command is for the fast-forward or for the rewind, the delay or the abandonment of the control command causes user-convenience to be lowered. The present exemplary embodiment exerts a remarkable effect.

After the TCP connection, in step S610, data communication (including transmission of the control command) is performed (see 506 in FIG. 5). In the present exemplary embodiment, in step S608, the priority information table 302 is set to the wireless LAN driver 404, so that the wireless LAN driver 404 sets the priority to the packet in data communication with reference to the priority information table 302. Further, the wireless LAN driver 404 sends the packet to which the priority is set, thereby performing the data communication.

The STA 102 executes steps S601 through 5608 repeatedly. Accordingly, the priority information table 302 can be updated, as needed, according to the service that the external device on the network is executing.

As described above, the communication device determines the service available on the LAN 108 by using the SSDP before the TCP connection. Further, the priority determined based on the provided service is set to the packet to establish the TCP connection.

The QoS middleware 402 sets the priority information table 302 to the wireless LAN driver 404, so that the priority is set to the packet independent from the priority set by the OS. Thereby the TCP connection can be established. Consequently, even in the case where the OS automatically sets the lower priority to the packet when the TCP connection is established, the priority is set to the packet based on information of the available service, thereby establishing the TCP connection.

As described above, since the TCP connection is established after confirming that the service of the packet sending destination is now available, the QoS control can be performed also in the TCP connection. When the TCP connection of the service, which is to be provided with the other communication having the higher priority, is established, the delay or the failure of the TCP connection can be reduced.

Examples of the service to be provided with the other communication having the higher priority include a service for allowing the user to perform an operation (e.g., the fast-forward and the rewind) and a service for controlling the network such as a communication band and a communication pathway. Further, the examples include a service for dealing with encryption key information and charging information.

If the application of the packet sending destination is not executed, the communication device sets the priority of the packet to be sent out to the network to a relatively lower value. Accordingly, it becomes possible that the packet of the higher priority is restrained from being sent out to the network when the application of the packet sending destination is not being executed.

It is also useful to add a configuration for determining the service type of the communication application established by the TCP connection and adding the information to the priority information table 302. Accordingly, the priority of the packet can be appropriately set also with respect to an area of the Wide Area Network (WAN) 109 to be connected to through the Router 107.

In the present exemplary embodiment, the service provided on the LAN 108 is searched for. However, in addition to the above, the service may be recognized based on a notification (appearance, deletion, start, stop, or error) from the service provided on the LAN 108.

Instead of the functional block diagram of FIG. 4A, a configuration of FIG. 4B may be employed. In FIG. 4B, the communication application 401 is in compliance with the UPnP. In this case, instead of step S601, the communication application 401 acquires the service information that the communication device on the LAN 108 provides. Further, the communication application 401 notifies the acquired service information to the QoS middleware 402. The QoS middleware 402, after receiving the notification of the service information, executes the processing in step S602 and subsequent steps.

Accordingly, in the case where the communication application 401 executes the processing to acquire the service information, the higher priority is restrained from being granted to the packet having no sending destination (i.e., not in execution). In the TCP connection, it becomes possible for the external device to send the packet according to the priority of the respective services in execution.

Instead of the functional block diagram of FIG. 4A, a configuration of FIG. 4C may be employed. In FIG. 4C, the QoS middleware 402 can monitor communication of the communication application 401 (sniffer). In this case, instead of step S601, the QoS middleware 402 acquires the service information provided by the communication device on the LAN 108 by sniffing the communication of the communication application 401.

After the QoS middleware 402 acquires the service information, the processing in step S602 and subsequent steps are executed. Further, it is also useful that the QoS middleware 402 acquires the service information provided by the communication device on the LAN 108 after receiving the notification from the communication control unit 403 may be employed.

In the above-described exemplary embodiment, the STA 104 provides the voice communication service and the AVTransport service by using the VoIP. However, in addition to the above, even in the case where a streaming delivery service of moving images and the AVTransport service, and the streaming delivery service of the moving images and the communication band control service are provided, the similar effect can be produced.

Figure 7:
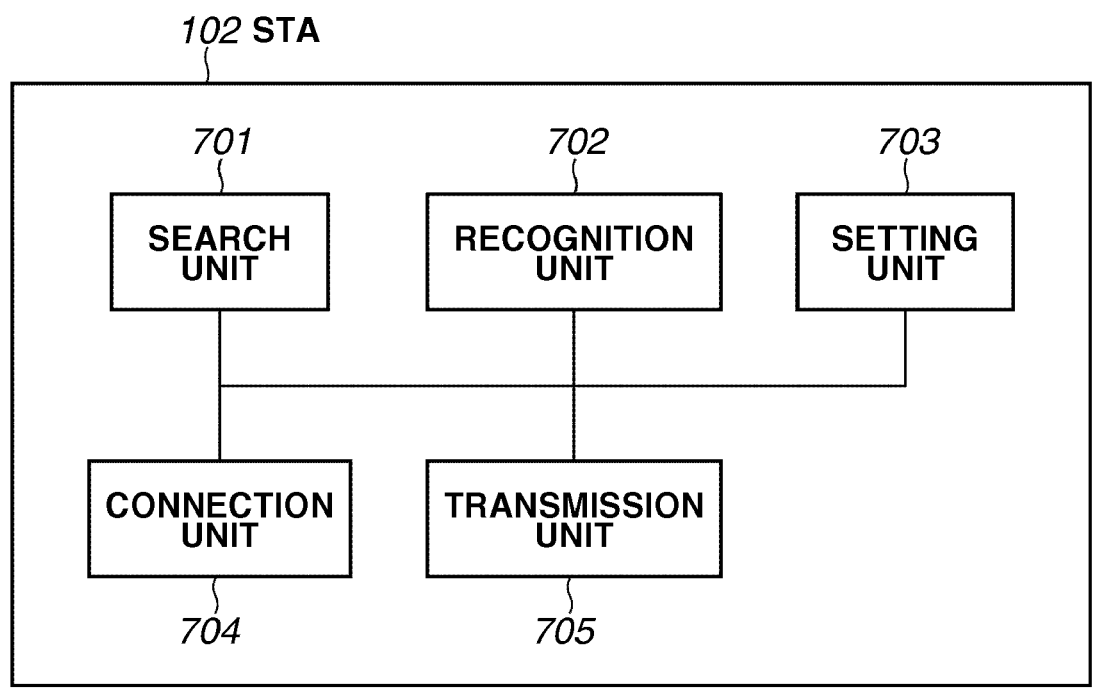
FIG. 7 is a functional block diagram of an STA.

The STA 102 as an example of the communication device according to the present exemplary embodiment can be illustrated as it is in FIG. 7. A search unit 701 searches for a service through the network. A recognition unit 702 recognizes the service provided through the network. The recognition unit 702 may be configured so as to recognize the service to which the predetermined priority is set. Further, the recognition unit 702 may be configured so as to recognize the appearance or the deletion of the service.

A setting unit 703 sets the priority to the packet according to the recognized service. The setting unit 703 may be configured to set a priority, which is lower than the predetermined priority, to the packet if the recognition unit 702 has not recognized the service.

A connection unit 704 establishes a connection by using the packet to which the priority is set. A transmission unit 705 sends the packet, to which the priority is set, to the other device for the data communication that is performed after the connection. With the above-described configuration, the QoS control can also be performed when establishing the connection for the service. Accordingly, a failure or a delay when the connection is established can be reduced.

When it is determined that the other device cannot provide a service through the network, the lower priority is set to the packet. Accordingly, the packet of the higher priority can be restrained from being sent out to the network when the service of the packet sending destination is not available on the network. Accordingly, a load of the network can be reduced.

A repetitive determination is made as to the existence of the service provided by the other device on the network. Accordingly, the QoS control can be performed according to the service existing on the network.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-036656 filed Feb. 19, 2009, which is hereby incorporated by reference herein in its entirety.

What is claimed is:

1. A communication device comprising:
a recognition unit configured to recognize a service, using a first priority higher than a second priority, provided by an external device;
a generation unit configured to generate a packet to be transmitted to the external device and to which the first priority is set, in a case that the service is recognized by the recognition unit; and
a connection unit configured to establish a connection with the external device using the packet generated by the generation unit,
wherein the generation unit is further configured to generate a packet to be transmitted to the external device and to which the second priority is set, in a case that no service is recognized by the recognition unit.

2. The communication device according to claim 1, further comprising:
a search unit configured to search for a service from a network,
wherein the recognition unit recognizes the service using the first priority.

3. The communication device according to claim 1, wherein the recognition unit recognizes one of a deletion or an appearance of the service.

4. The communication device according to claim 1, further comprising:
a transmission unit configured to send the packet generated by the generation unit to the external device after the connection by the connection unit.

5. A method for controlling a communication device, the method comprising:
recognizing a service, using a first priority higher than a second priority, provided by an external device;
generating a packet to be transmitted to the external device and to which the first priority is set, in a case that the service is recognized;
generating a packet to be transmitted to the external device and to which the second priority is set, in a case that no service is recognized; and
connecting with the external device using the generated packet.

6. A non-transitory storage medium storing a computer-executable program, which, when executed by a computer, causes the computer to perform a method for controlling a communication device, the method comprising:
recognizing a service, using a first priority higher than a second priority, provided by an external device;
generating a packet to be transmitted to the external device and to which the first priority is set, in a case that the service is recognized;
generating a packet to be transmitted to the external device and to which the second priority is set, in a case that no service is recognized; and
connecting with the external device using the generated packet.

* * * * *